June 14, 1927.
G. R. FONDA
1,632,647
INCANDESCENT LAMP
Filed Jan. 24, 1925
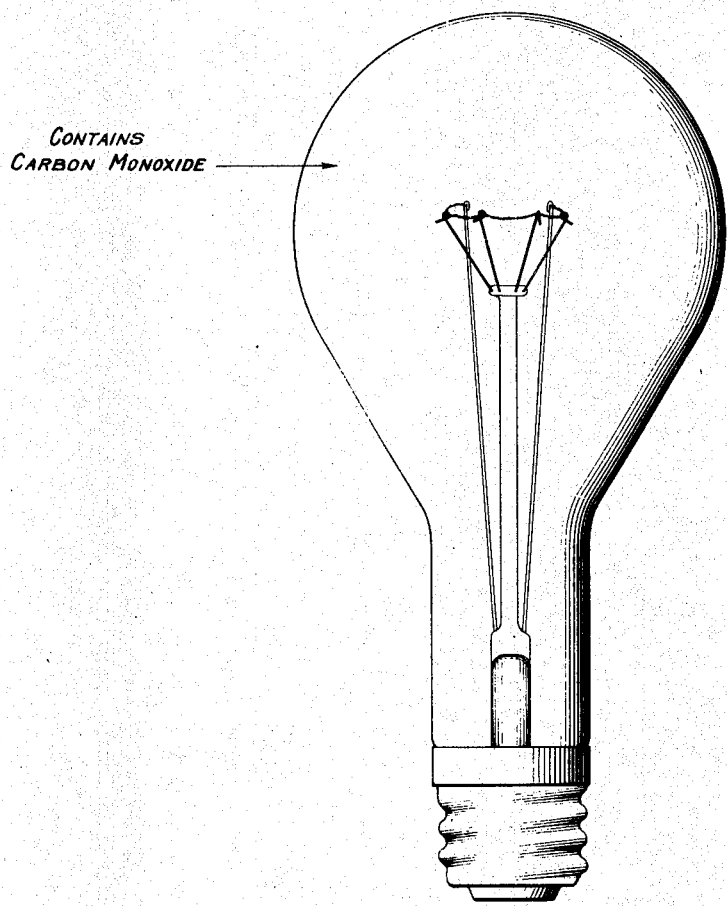
Inventor:
Gorton R. Fonda,
by
His Attorney.

Patented June 14, 1927.

1,632,647

UNITED STATES PATENT OFFICE.

GORTON R. FONDA, OF SCHENECTADY, NEW YORK, ASSIGNOR TO GENERAL ELECTRIC COMPANY, A CORPORATION OF NEW YORK.

INCANDESCENT LAMP.

Application filed January 24, 1925. Serial No. 4,608.

The present invention comprises an improvement in electric incandescent lamps of the gas-filled type, and it is the object of my invention to increase the resistance to disintegration under operating conditions, and the mechanical strength of lighting filaments in lamps of this type.

In accordance with my invention marked improvement is effected in gas-filled lamps by the addition of carbon monoxide to the filling of inert gas in the lamp bulb.

The accompanying drawing shows for illustrative purposes an incandescent lamp embodying my invention.

Gas-filled incandescent lamps are described in Langmuir Patent, No. 1,180,159 of April 18, 1916 and comprise in general, as indicated in the drawing, a sealed bulb 1, in which is provided a filament 2, ordinarily consisting of tungsten, the filament being supported on holders 3 which in turn are mounted on a glass pedestal 4. The filament 2 usually is constituted of a closely wound helix to increase its effective diameter and thus to reduce heat losses. The filament is connected as usual to a screw base 5.

During the manufacture the bulb first is carefully evacuated of air and water vapor and then is charged with a suitable gas. For example, a filling of argon at a pressure of about two-thirds of an atmosphere may be provided. The argon gas to advantage may contain some nitrogen gas, say ten to twenty per cent.

I have discovered that at a given lighting efficiency the life of a lamp of this type can be materially increased by the addition of carbon monoxide gas in amounts as little as a few hundredths of one per cent. The increase of life varies considerably with different lamps which appears to indicate that the carbon monoxide removes impurities from the filament which are present in variable amounts in different filaments. I have obtained, for example, by an addition of about 150 to 300 microns of carbon monoxide (0.15 to 0.30 mm. of mercury) to 600 mm. of argon gas in different lamps, increases of life ranging from ten to forty per cent when operating with the same lighting efficiency. Instead of operating lamps containing carbon monoxide at the same efficiency as lamps not so provided, the lamps may be operated at a higher lighting efficiency without decrease of life. When lamps thus charged with argon containing a small amount of carbon monoxide are operated a life of about 1,000 hours, an increase of about two to four per cent in lighting efficiency is obtained. In isolated cases the improvement will be even greater.

The burn-out of a filament in a gas-filled lamp is usually due to a local failure which occurs before the filament has wasted away by vaporization as much as in a vacuum lamp. The beneficial effect of the carbon monoxide appears to be largely due to a postponement of the time of local failure of the filament.

What I claim as new and desire to secure by Letters Patent of the United States, is:—

1. An incandescent lamp of the gas-filled type, the gas-filling of which comprises a few hundredths of one per cent of carbon monoxide.

2. An incandescent lamp comprising a sealed bulb, a lighting filament therein, a gas-filling consisting largely of argon and in lesser proportion of carbon monoxide.

3. An incandescent lamp containing a gas at a pressure of the order of magnitude of two-thirds of an atmosphere and comprising as a constituent a few hundredths of one per cent of carbon monoxide.

4. An incandescent lamp comprising a sealed bulb, a tungsten filament therein, and a gas-filling comprising a mixture of argon, nitrogen and carbon monoxide, the argon largely predominating in said mixture and having a content of carbon monoxide materially less than one per cent.

5. An incandescent lamp comprising a sealed bulb, a filament of tungsten therein, a filling of gas inert with respect to tungsten at a pressure of about 600 mm. of mercury containing several hundredths of one per cent of carbon monoxide, said lamp being substantially devoid of oxygen and water vapor and being capable of operating with a longer life than a similar lamp unprovided with carbon monoxide.

In witness whereof, I have hereunto set my hand this 23rd day of January, 1925.

GORTON R. FONDA.